United States Patent Office 2,765,212
Patented Oct. 2, 1956

2,765,212

PREPARATION OF MAGNESIUM CARBONATE

Herman C. Froelich, Cleveland Heights, Ohio, assignor to General Electric Company, a corporation of New York No Drawing. Application February 6, 1953, Serial No. 335,603

5 Claims. (Cl. 23—67)

My invention relates to a process for manufacturing magnesium carbonate.

Magnesium carbonate is used extensively as a source of magnesium oxide which is one of the ingredients used as a raw material in the preparation of magnesium tungstate phosphors such as those disclosed in Patents 2,203,-682 and 2,232,780, Foulke. It is also the principal ingredient in the preparation of such phosphors as magnesium germanate and magnesium arsenate, and it is one of the objects of my invention to provide a magnesium oxide of high purity and fine particle size which makes it particularly suitable for such use.

Magnesium carbonate is generally prepared by the precipitation of a water soluble magnesium salt such as magnesium nitrate with ammonium carbonate, and the oxide is prepared by igniting the dried precipitate. These reactions give a good product which, however, shows low yield (about two-thirds of theoretical magnesium oxide) and is expensive due to the high cost of magnesium nitrate.

Precipitation of magnesium carbonate by the addition of ammonium carbonate to a solution of magnesium sulphate gives better yield and is much cheaper, Epsom salts ($MgSO_4.7H_2O$) being a very inexpensive raw material, but the product contains appreciable amounts of contaminating sulfate, present either as an occlusion or as a double salt, which cannot be washed out. Since magnesium sulfate does not decompose to yield oxide upon heating to temperatures of the order of 1000° C. or lower ($MgSO_4$ has a melting point of 1185° C.), the resulting product is not suitable as a raw material for some phosphors.

Conducting the above reactions at elevated temperatures will not improve the result as magnesium carbonate becomes soluble in the by-product ammonium nitrate or sulfate solutions formed in the reactions, thus further reducing the yield.

It is, therefore, a further object of my invention to provide a simple, economical procedure for the preparation of pure magnesium carbonate from an inexpensive starting material which produces high yields close to 90 percent.

I have found that the above objects may be attained when the previously outlined one-step reaction is resolved into a two-step process which employs pure magnesium sulfate and pure ammonium carbonate as the reactants, but under conditions which permit the removal of contaminating sulfates. To this end the process comprises, in general, precipitating the magnesium carbonate by adding an aqueous solution of magnesium sulfate to a saturated, ammoniacal solution of ammonium carbonate. The precipitate is filtered and washed. In the second step the precipitate is reslurried with water containing 5 to 15 percent by weight of the amount of ammonium carbonate used in the first precipitation step, and is boiled for about 15 minutes, filtered and washed until free of sulfate. To obtain maximum results the following conditions should be observed:

(A) The commercially pure reactants, magnesium sulfate and ammonium carbonate, are further purified before use by treating with hydrogen sulfide or ammonium sulfide to precipitate iron, copper and other impurities.

(B) The purified reactants are preferably mixed cold, that is, and will hereinafter mean, room temperature of about 20 to 30° C. However, if desired, the reactants may be heated, for example, the magnesium sulfate to about 80° C. and the ammonium carbonate to about 55° C. The addition of ammonia and stirring causes the precipitate to form. The ammonia is added to be sure the mixture is on the basic side since ammonium carbonate, either through prolonged standing or accidental heating, will tend to lose some ammonia.

(C) After the first filtration, the precipitate formed in "(B)" above is washed with water containing 1 to 2 percent ammonium carbonate. The ammonium carbonate is present to add a common ion in order to reduce solubility of the magnesium carbonate in the wash water.

(D) As the second step of the process, the washed precipitate is reslurried with water containing 5 to 15 percent of the amount of ammonium carbonate and free ammonia used in the first precipitation step. The free ammonia is present to insure a basic or at least neutral carbonate so that there is no loss of the easily dissociated ammonia from the liquid. The ammonium carbonate is present in this step for a different reason than in the washing operation. Here its purpose is to convert any occluded magnesium sulfate or insoluble double salts of ammonium magnesium sulfate

present in the precipitate into magnesium carbonate and soluble ammonium sulfate.

(E) The reslurried precipitate is boiled for 10 to 20 minutes, preferably 15 minutes, after which the precipitate is again filtered and washed with water preferably containing 1 to 2 percent ammonium carbonate as before until the filtrate is free of sulfate. This can be determined by any of the standard tests. The boiling aids in the breaking up of the otherwise stiff gels which form in the reaction. However, the strong swelling which causes the gel to form is partly responsible for the ultimate fineness and purity of the product. These gels break rapidly on heating or upon the addition of water and ammonia, but do not break when standing in the cold for prolonged periods.

(F) During the second step of the process, the contaminating sulfate, present either as an occlusion in the carbonate or as a double salt, reacts with the ammonium carbonate yielding magnesium carbonate and soluble ammonium sulfate. This reaction is carried out in the absence of large amounts of ammonium nitrate or sulfate such as were present during the first step of the process. Thus no appreciable loss due to greater solubility is suffered.

(G) The magnesium carbonate precipitate is dried and ignited to oxide and is found to contain but one or a few hundredths of one percent contaminating sulfate. The yield is close to 90 percent of theoretical magnesium oxide and the resulting oxide is very fine and bulky, having a particle size ranging from a fraction of a micron to a few microns, one pound occupying a volume of more than one gallon.

The process will now be described in greater detail by way of one specific example thereof:

An aqueous, cold solution of 2500 grams of purified magnesium sulfate ($MgSO_4.7H_2O$) in 5000 cc. total volume is added to a nearly saturated, cold, ammoniacal solution of 1000 grams of purified ammonium carbonate in 2250 cc. total volume, the ammonium carbonate being a few percent (1 to 5 percent) by weight in excess of the amount required to react with the magnesium sulfate. Upon the addition of about 200 cc. or less of ammonia and stirring, a precipitate is formed. When the first thick mass has become liquified it is filtered, for instance, on a Buchner filter or a centrifuge, and washed twice with water containing 1 to 2 percent by weight ammonium carbonate. It is then reslurried in a glass beaker with water to which has been added 100 grams of ammonium carbonate and 20 cc. of free ammonia, each representing 10 percent of the amount used in the first precipitation step, brought to a boil and kept boiling for about 15 minutes. The precipitate is again filtered off and washed with water containing 1 to 2 percent by weight ammonium carbonate until the filtrate is free of sulfate. To form the oxide, the precipitate is dried and ignited at about 700° C. The contaminating sulfate in the product is found to be in the neighborhood of 0.01 percent.

A modification of the process applicable to larger scale production involves carrying out the two-step precipitation entirely in the cold rather than first cold then hot. This calls for larger amounts of water (up to twice the volume of the original method) and larger amounts of ammonia sufficient to keep the pH value of the reaction mixture around 9. The additional water and ammonia are necessary to aid in breaking up the formation of the otherwise stiff gels previously mentioned. The magnesium carbonate precipitate is, in most cases, not as entirely free of sulfate as the product obtained by the method first described above. The product of the modified method contains up to five times the amount of contaminant, but it nevertheless produces good magnesium tungstate and magnesium germanate phosphors.

The magnesium oxide prepared in accordance with my invention may be used, for example, in the manufacture of magnesium tungstate phosphor. Such phosphors may in general be prepared by mixing tungstic oxide and magnesium oxide and firing at a temperature of the order of 1100° C. for a period of the order of one-half hour. Reference may be had to Foulke patent No. 2,203,682 for further details of a suitable method.

Although a preferred embodiment of my invention has been disclosed, it is recognized that variations and changes may be made therein within the spirit and scope of the invention as defined by the appended claims. It is understood particularly that the proportions given above and also the time and temperatures can be varied within fairly wide limits to obtain the desired results.

What I claim as new and desire to secure by Letters Patent of the United States is:

1. The process of manufacturing magnesium carbonate which comprises precipitating magnesium carbonate particles by addition of magnesium sulfate solution to a solution of ammonium carbonate, washing the magnesium carbonate precipitate with water, converting occluded insoluble magnesium sulfate and double salts of ammonium-magnesium sulfate present in said precipitate into magnesium carbonate and soluble ammonium sulfate by reslurrying said precipitate with water containing ammonium carbonate, filtering and again washing the precipitate with water.

2. The process of manufacturing magnesium carbonate which comprises precipitating magnesium carbonate particles by addition of magnesium sulfate solution to a solution of ammonium carbonate, the said ammonium carbonate being in excess of about 1 to 5 percent, washing the magnesium carbonate precipitate with water containing 1 to 2 percent ammonium carbonate, converting occluded insoluble magnesium sulfate and double salts of ammonium-magnesium sulfate present in said precipitate into magnesium carbonate and soluble ammonium sulfate by reslurrying said precipitate with water containing ammonium carbonate in an amount of about 5 to 15 percent of that used in the first-mentioned precipitation step, filtering and again washing the precipitate with water containing 1 to 2 percent ammonium carbonate.

3. The process of manufacturing magnesium carbonate which comprises precipitating magnesium carbonate particles by addition of magnesium sulfate solution to a solution of ammonium carbonate, the concentration of the magnesium sulfate solution being in the range of about 300 to 700 grams per liter and the ammonium carbonate solution being nearly saturated and in amount at least sufficient to react with the magnesium sulfate, washing the magnesium carbonate precipitate with water, converting occluded insoluble magnesium sulfate and double salts of ammonium-magnesium sulfate present in said precipitate into magnesium carbonate and soluble ammonium sulfate by reslurrying said precipitate with water containing ammonium carbonate, filtering and again washing the precipitate with water.

4. The process of manufacturing magnesium carbonate which comprises precipitating magnesium carbonate particles by addition of magnesium sulfate solution to a solution of ammonium carbonate, washing the magnesium carbonate precipitate with water, converting occluded insoluble magnesium sulfate and double salts of ammonium-magnesium sulfate present in said precipitate into magnesium carbonate and soluble ammonium sulfate by reslurrying said precipitate with water containing ammonium carbonate, boiling the resultant slurry for a period of about 10 to 20 minutes, filtering and again washing the precipitate with water.

5. The process of manufacturing magnesium carbonate which comprises precipitating magnesium carbonate particles by addition of magnesium sulfate solution to a solution of ammonium carbonate, the said ammonium carbonate being in excess of about 1 to 5 per cent, the concentration of the magnesium sulfate solution being in the range of about 300 to 700 grams per liter, and the ammonium carbonate solution being nearly saturated and in amount at least sufficient to react with the magnesium sulfate, washing the magnesium carbonate precipitate with water containing 1 to 2 per cent ammonium carbonate, converting occluded insoluble magnesium sulfate and double salts of ammonium-magnesium sulfate present in said precipitate into magnesium carbonate and soluble ammonium sulfate by reslurrying said precipitate with water containing ammonium carbonate in amount of about 5 to 15 per cent of that used in the first-mentioned precipitation step, boiling the resultant slurry for a period of about 10 to 20 minutes, filtering and again washing the precipitate with water containing 1 to 2 per cent ammonium carbonate.

References Cited in the file of this patent

UNITED STATES PATENTS

| | | |
|---|---|---|
| 303,962 | Wunsche | Aug. 19, 1884 |
| 1,163,475 | Silbermann | Dec. 7, 1915 |
| 2,143,774 | Hart | Jan. 10, 1939 |
| 2,550,708 | Meyer | May 1, 1951 |

OTHER REFERENCES

Mellor: "Comprehensive Treatise on Inorganic and Theoretical Chemistry" (Longmans, Green and Co., 1923, page 349).

Gmelin-Kraut: "Handbuch der Anorganisch Chemie" (Heidelberg 1909, page 459).